United States Patent Office 3,421,329
Patented Jan. 14, 1969

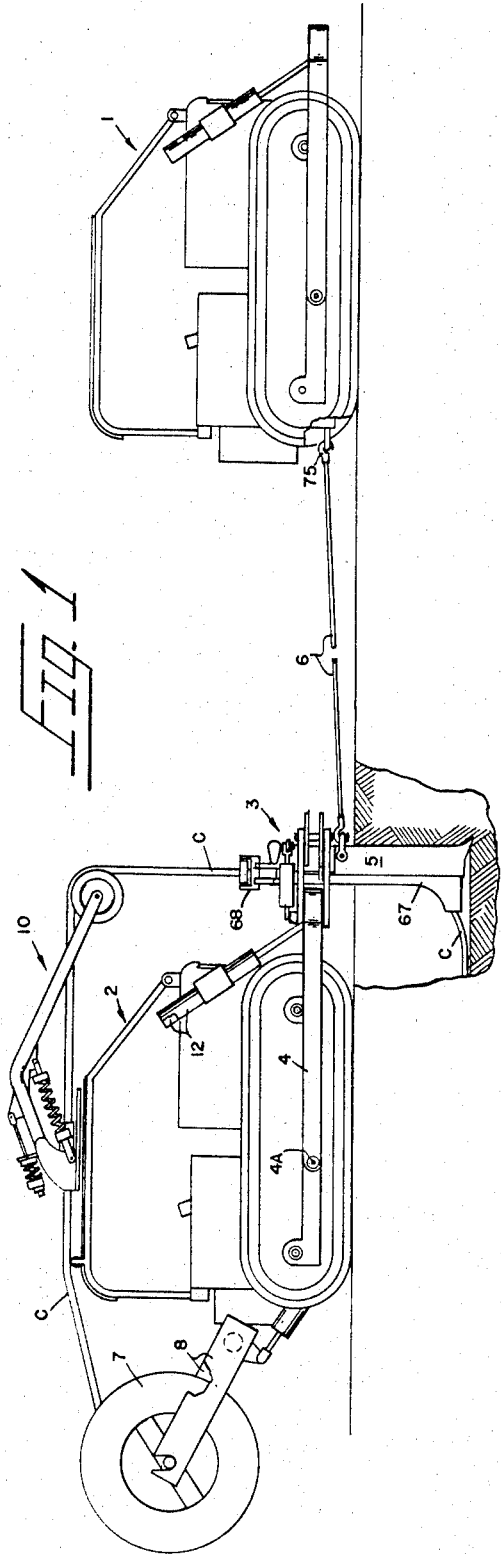

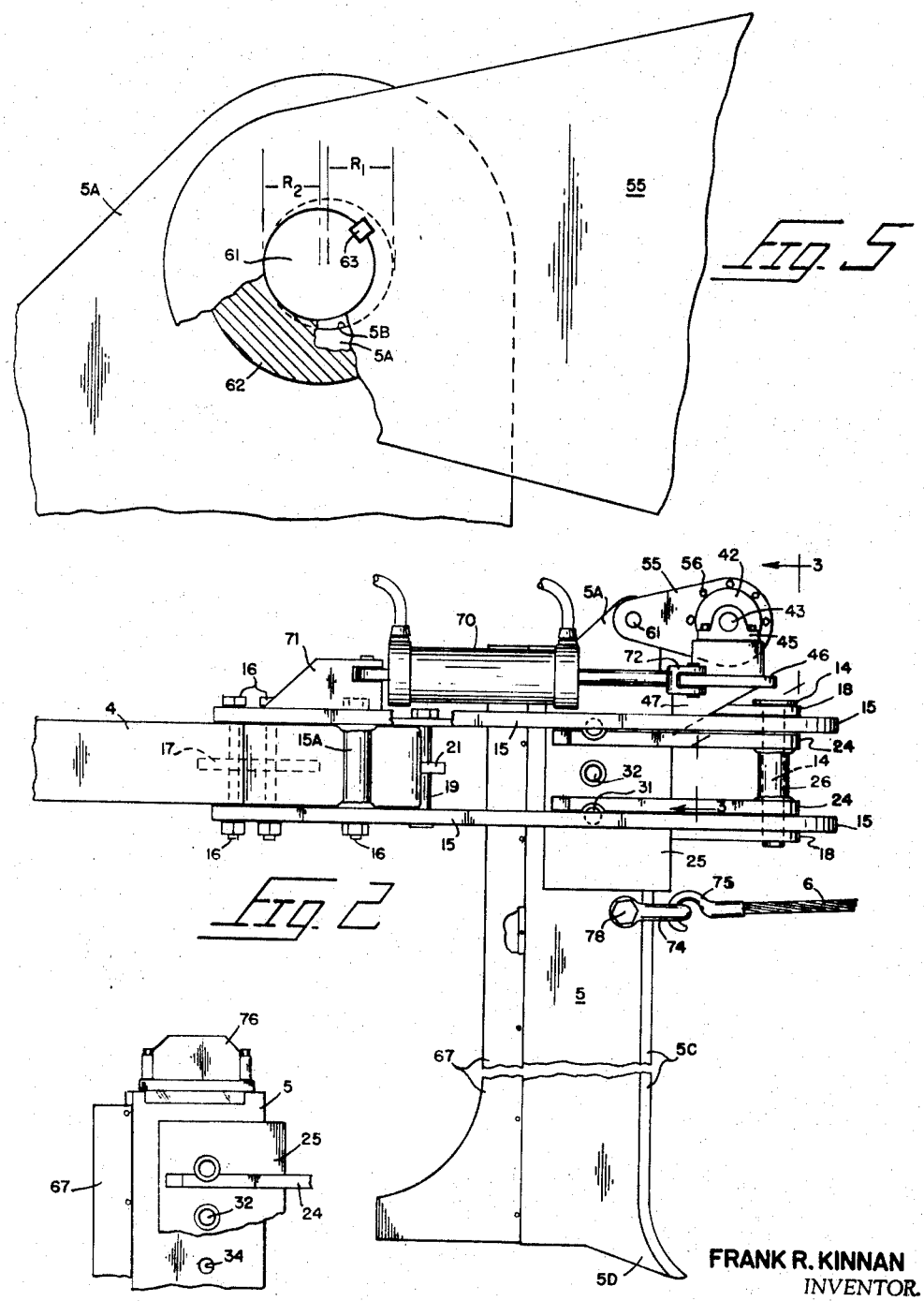

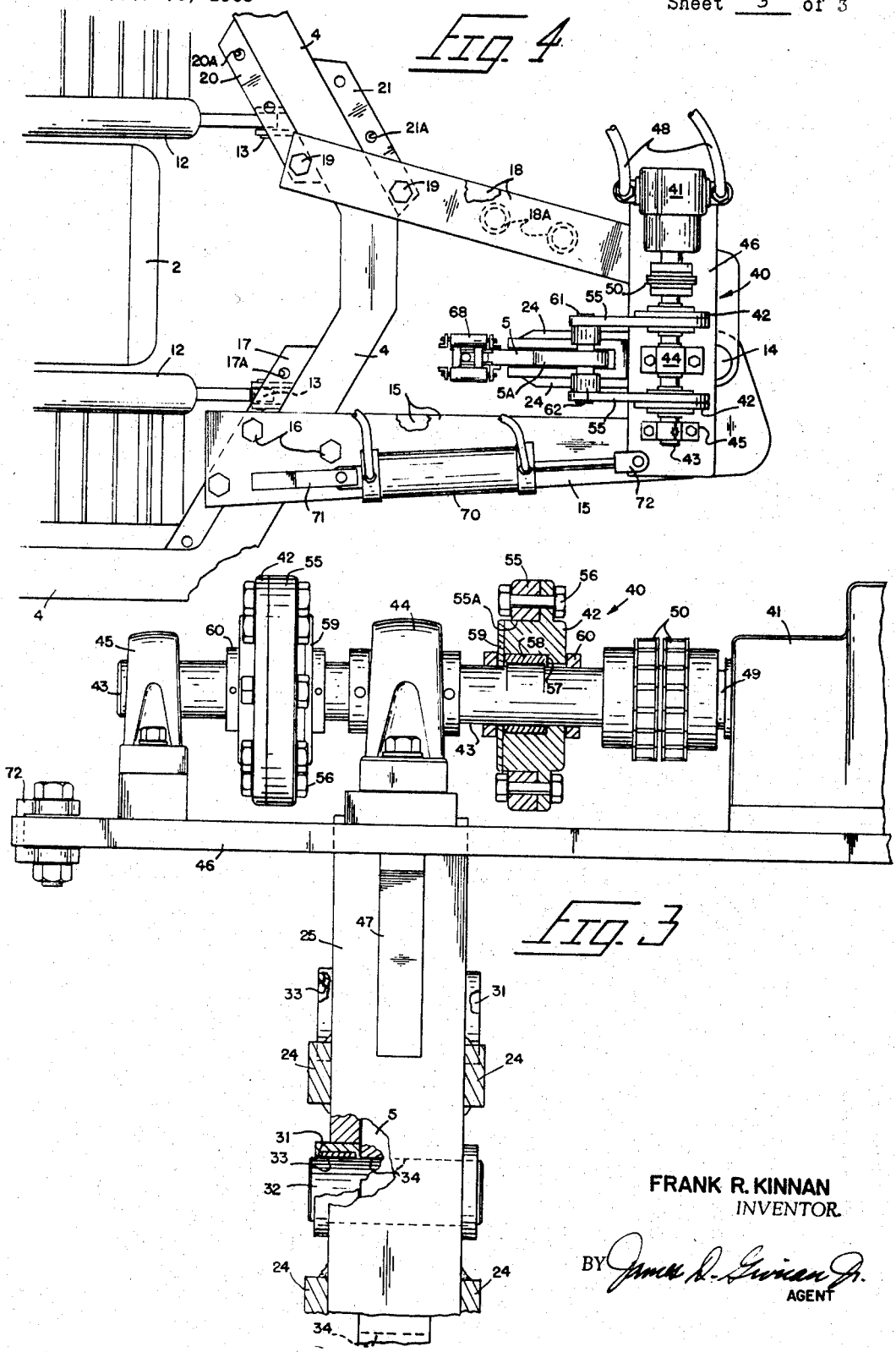

3,421,329
OSCILLATING GROUND ENGAGING
INSTRUMENT
Frank R. Kinnan, Camas Valley, Oreg., assignor to Henkels and McCoy Inc., Blue Bell, Pa., a corporation of Pennsylvania
Filed Oct. 24, 1965, Ser. No. 504,836
U.S. Cl. 61—72.6   9 Claims
Int. Cl. F16l 1/00; E02f 5/02; A01b 35/08

ABSTRACT OF THE DISCLOSURE

An apparatus for the forming of a kerf within the ground and for deposit therein of cables or conduits, the apparatus being shown forwardly mounted on a tractor type vehicle and having an upright blade loosely coupled at its upper end to means for imparting oscillatory motion to the blade. The blade is rockably mounted for movement about a horizontal axis. Further, the blade is mounted for steerable movement to facilitate changes in direction of the supporting vehicle. The blade may be coupled with a second vehicle forwardly located from the first vehicle to exert a forward pull on the blade.

---

This invention relates to ground separating apparatus and more particularly to an oscillatory instrument carried by a vehicle and forming a trench for the reception of a continuous flexible cable or conduit deposited therein by said instrument.

An important feature of the present invention is the provision of an oscillatory ground engaging blade in combination with means for actuating same which avoid subjecting the supporting vehicle to severe and deleterious vibration. For the most part, vibratory ground engaging instruments have been limited in size and application by the ability of the supporting vehicle to withstand the undesirable effects of vibration.

A further object of the invention resides in the provision of blade oscillating means including motor means driven by a regulatory medium which facilitates accurate control of the oscillatory rate of the blade. This feature of the invention is significant in view of the resonant principle involved requiring more or less continuous frequency changes as necessitated by the varying ground conditions encountered.

A still further object is the provision of means mounting the ground separating apparatus forward of its supporting vehicle at various selected lateral distances from the vehicle centerline to permit accurate trench forming in full forward view of the vehicle operator. The mounting means is attachable to the push bar of any crawler type tractor with only a slight modification of the latter being required.

These and other objects will become subsequently apparent upon subsequent understanding of the following specification and drawings referred to therein and in which:

FIGURE 1 is a side elevational view of a pair of crawler type tractors positioned in tandem with the ground separating apparatus mounted on the push bar of the left hand or trailing tractor.

FIGURE 2 is a side elevational view of the present ground separating apparatus shown in supported engagement with a fragment of the vehicle's push bar.

FIGURE 3 is a sectional elevational view of the apparatus taken along line 3—3 of FIGURE 2 with fragments broken away for purposes of illustration.

FIGURE 4 is a plan view of the present invention including fragments of related parts of the supporting vehicle.

FIGURE 5 is a fragmentary view on an enlarged scale of means for imparting oscillatory motion to the blade of the ground separating apparatus.

The present invention is embodied in an upright, forwardly mounted blade component adapted to be supported by a first vehicle for advancement through the ground while simultaneously moving fore and aft in an oscillating manner under impact blows delivered to its upper extremity through a lost motion type coupling. To further enhance the blade's earth penetration capability a forwardly directed, continuous force utilizing a second vehicle may be imparted to the blade at a point below the blade's fulcrum for oscillatory movement oppositely from the lost motion coupling. The blade, mounting means therefor and oscillating means coupled with the blade are all positionable about an upright axis to permit changes in the vehicle's path.

With continuing reference to the drawings and particularly FIGURE 1 thereof, the numerals 1 and 2 designate crawler type tractors disposed in a tandem manner. The ground-separating apparatus generally termed a cable plow in the art is indicated generally at 3, mounted upon the push bar 4 of tractor 2, and includes a vertically disposed blade 5. A cable 6 interconnects the blade 5 with the tractor 1.

A supply of electrical cable or conduit designated C is provided by a conventional storage reel 7 journalled within the outer ends of a pair of arms 8. The cable C is drawn from the reel 7 and properly tensioned prior to its downward passage through the cable plow 3 by a roof mounted mechanism indicated generally at 10. The mechanism 10 is the subject of a separate patent application entitled Power Actuated Cable Feed and Tensioning Mechanism, now Patent No. 3,343,739. A continuous run of the cable C is laid within the trench shown in FIGURE 1, the latter being formed by the leading edge 5C of the blade component 5. Push bar 4 is carried by tractor 2 in the typical manner utilizing a pair of side mounted hydraulic cylinders 12 pivotally connected at their rod ends as at 13 to the push bar for movement of the latter about a bearing 4A.

The oscillatory cable plow indicated generally at 3 is attached to the push bar 4 by two pairs indicated at 15 and 18 of rearwardly extending, vertically spaced plate members (FIGURES 2 and 4) which converge at their forward ends and are thereat interconnected by a vertically disposed pin 14 to thereby provide a supporting framework. The first pair of plates 15 consist of top and a bottom identical plate members in clamped engagements with the push bar by means of bolts 16. Bolts 16 extend through an elongated flange 17, apertured as at 17a, and welded to the rearward vertical wall of the push bar 4, while forward of the push bar a single bolt extends through a collar 15A welded intermediate the plates 15. Secured in a similar manner to the push bar 4 are the corresponding ends of the second pair of plate members 18 which are attached to the push bar by bolts 19 extending through flanges 20 and 21, horizontally disposed on opposite side of the push bar. The plates 18 are reinforced with spacers 18A which serve to prevent distortion thereof under operating loads. Apertures 20A and 21A provided in flanges 20 and 21 allow mounting of the plates 18 at horizontally spaced apart locations along the push bar, and in a like manner bolts 16 may be selectively inserted in apertures 17A of flange 17 for positioning the cable plow 3 transversely of the tractor's longitudinal centerline. Such positioning of the cable plow 3 is desirable when cable is being laid near buildings, fences or other structures.

As best shown in FIGURE 2, pin 14 extends through the forward ends of both pairs of plates 15 and 18, as aforesaid, and through blade element mounting means including upper and lower brackets 24 each of which support near their opposite ends a blade holder 25. A collar 26 is welded intermediate the forward ends of the brackets 24 and receives pin 14 to provide a bearing surface for the horizontal swinging movement of the brackets 24 and blade holder 25 of the blade element mounting means about the axis of pin 14. Blade holder 25 is of channel form in horizontal section to receive the blade 5.

A series of three vertically spaced openings 31 are formed in the opposing flanges of the blade holder for the selective insertion of a single transverse pivot pin 32, interconnecting the blade 5 and blade holder 25. Corresponding apertures 34 in the blade are formed in axial alignment with openings 31. Bushings 33 are provided within the openings 31 and constitute bearings for pin 32. While shown in FIGURE 3 positioned within the intermediate pair of openings, pin 32 may be selectively inserted within either of the remaining openings and apertures 34 depending upon the existing operating conditions, for purposes more fully hereinafter elaborated upon.

Oscillating means are indicated generally at 40 including a motor 41, a pair of cam followers 42, a shaft 43 journalled in bearings 44 and 45 all of which are supported by a base 46 located forward and in crosswise relationship to the blade and blade holder 25. A gusset 47 is welded to the web of the blade holder and the underside of base 46. The motor is preferably hydraulic in view of the hydraulic system common to such tractors which may be easily adapted to provide a hydraulic circuit including fluid metering means (not shown) and fluid conduits 48. A motor shaft 49 terminates within a suitable flexible coupling 50 as does one end of shaft 43, the latter having a pair of identical cam lobes, one of which is indicated at 52. The flexible coupling 50 serves to dampen impact loads on motor shaft 49 transmitted by shaft 43 during operation of the cable plow. A pair of arm members 55 are formed as at 55A to receive in bolted engagement as at 56 the cam followers 42 to impart a reciprocal, generally horizontal motion to the upper end of blade 5 about the axis of pivot pin 32.

Each of the cam followers 42 are centrally recessed at 57 to receive a bushing 58 for the cam lobe 52. Locking rings 60 secure the cam followers against axial displacement and plate 59 retains the bushing 58 in place as well as providing a lubricant seal. Lubrication fittings (not shown) are provided on the cam followers 42. The bearing arrangement shown and described is exemplary only and may be varied from without departing from the spirit and scope of the present invention.

Arms 55 terminate rearwardly on opposite sides of an upward extension 5A (FIGURE 5) of the blade 5 and are interconnected by a transversely positioned pin 61 extending through an aperture 5B of greater diameter formed in the extension 5A to thus provide a lost motion type coupling. Bosses 62 for the pin 61 are integral with arms 55. Pin 61 may be readily replaced by removal of a key 63. By way of example, it has been found practical to form the aperture 5B on an inch radius indicated at $R_1$ and the pin 61 on a seven-eighths inch radius indicated at $R_2$.

With continuing regard to the blade 5, it is of uniform thickness, beveled along its leading edge as at 5C for obvious reasons and terminates at its lower forward end in a diagonally extending tang 5D. Lengthwise along the rearward edge of the blade is an elongated open ended housing 67 providing a passageway for the downward travel therethrough of the flexible cable or conduit C. Carried by the blade and elevated slightly therefrom is a cable guide assembly 68 for aligning, with minimum fraction, the cable C with the housing 67.

The blade holder 25 along with blade 5 are positioned about the axis of the pin 14 to minimize the side loading thereof during changes in the course of the conduit being laid. Such positioning is by means of a double acting hydraulic cylinder 70 mounted at its cylinder end to a support 71 with its rod end 72 supported by pivotal engagement with one end of the base 46. During the placement of cable along a linear path, the cylinder 70 may be unpressurized since the cable plow assembly will trail in the position of FIGURE 4. Although shown as being in fixed relationship to blade 5, the housing 67 may be pivotally attached at points along the rearward edge of the blade to facilitate altering the blade's path. Secured as at 73 to blade 5 adjacent the leading edge thereof and immediately below the blade holder 25 is a shackle 74 for hooked engagement with one end of the cable 6 provided with a hook member 75 at both of its ends. Cable 6 may be approximately forty feet in length.

In operation the motive force of the tractor 2 is imparted to the plow blade 5 through pairs of plates 15 and 18, pin 14, brackets 24, blade holder 25 and pivot pin 32. The pull exerted by tractor 1 through cable 6 on the plow blade is substantially equal to the first mentioned force exerted by tractor 1 resulting in the blade assuming a neutral vertical position intermediate its fore and aft limits of travel about the horizontal axis of pivot pin 32. From this it will be seen that the oscillating motion imparted to the upper end of blade 5 by the loosely fitted pin 61 will cause the travel of the lower end of blade 5 to be opposed in one direction by the cable 6 and in an opposite or forward direction by the ground being separated. Stated otherwise, the oscillating means acts against the resilient property of cable 5 and alternately in an opposite or forward direction against the ground.

The free travel of pin 61 within the oversized aperture 5B results in a sharp, hammer-like force being imparted to the blade immediately prior to the terminus of the pin's fore and aft movement. Varying the speed of the motor 41 results in changes in the forced frequency transmitted to the ground ahead of the blade enabling selection of the most suitable speed. From the foregoing it will be seen that by utilizing a selected frequency the ground resistance is lessened and the resultant vibration imparted to the supporting vehicle is considerably less than a fixed blade or an oscillating blade with a positive connection between the blade and pin 61. It will be apparent that the location of pin 32 to determine the most efficient travel of blade which vary depending on the ground condition and depth of blade penetration.

FIGURE 6 shows a modified form of the present apparatus suitable for use in easily worked ground wherein a vibratory unit 76 is carried by the blade 5 and imparts a reciprocal motion thereto for movement about the horizontal axis of pin 32. For such use the second vehicle and interconnecting cable would not be required.

Although shown and described in conjunction with a cable plow, the present invention has additional applications in the field of ground working tools. While the cable plow 3 is shown and described in conjunction with a pair of vehicles, it is not limited to such since practical applications of the plow can be made without the use of the forward tractor 1.

While I have shown particular forms of embodiment of my invention, I am aware that additional changes therein will readily suggest themselves to others skilled in the art without departing from the spirit and scope of the invention. Having thus described my invention, what I claim as new and desire to protect by Letters Patent is:

1. A ground separating and trench forming apparatus in supported engagement with a vehicle, said apparatus comprising;
   an upright blade element adapted for movement along a horizontal path and extending below the ground surface,
   an elongated housing carried by said blade element for the downward passage therethrough of a flexible conduit for deposit within the trench formed,
   a supporting framework mounted on said vehicle,
   blade element mounting means hingedly attached to said supporting framework for movement of said mounting means about an upright axis and including pivot means having a horizontal axis and attaching said blade element to said mounting means in a manner permitting oscillatory movement of said blade element about said horizontal axis,
   means imparting oscillatory motion carried by said mounting means and coupled to said blade element and imparting reciprocal motion to said blade element for movement about said horizontal axis.

2. A ground separating and trench forming apparatus as claimed in claim 1 including pressure responsive means coupling said supporting framework and said mounting means for horizontal positioning of the latter about said upright axis whereby the upright blade element carried by said mounting means may be positioned to facilitate altering the path thereof.

3. A ground separating and trench forming apparatus in supported engagement with the push bar of a tractor, said apparatus comprising,
   a supporting framework including horizontal plate members attached at their rearward ends to the push bar of a tractor and converging in overlying relationship at their forward ends,
   an upright blade element having leading and trailing edges for advancement along a horizontal path extending below the ground surface,
   an elongated housing attached to said blade along the trailing edge thereof for the downward passage therethrough of a flexible conduit for deposit within the trench formed,
   a blade holder U-shaped in horizontal section and including pivot means having a horizontal axis and attaching said blade element within said blade holder in a manner permitting oscillatory movement of said blade element about said horizontal axis, said blade holder further including forwardly extending bracket means pivotally attached at its forward end to the forward ends of said plate members for relative swinging movement between said supporting framework and said blade holder about an upright axis,
   means imparting oscillatory motion carried by said blade holder and coupled to said blade element above said pivot means and imparting reciprocal motion to said blade element for movement about said horizontal axis of said pivot means.

4. A ground separating and trench forming apparatus as claimed in claim 3 wherein said means imparting oscillatory motion includes a variable speed motor whereby the oscillatory rate of said blade element may be selected to impart a forced frequency to the ground being separated matching the resonant frequency thereof whereby the resistance of the ground to the advancement of the blade element is lessened.

5. A ground separating apparatus as claimed in claim 3 including means attached to said blade element below said pivot means and exerting a substantially constant forward pull thereon against the resistance of the ground being separated.

6. A ground separating and trench forming apparatus as claimed in claim 3 wherein said means imparting oscillatory motion includes lost motion coupling means interconnecting said blade element and said means for imparting oscillatory motion.

7. A ground separating and trench forming apparatus in supported engagement with the push bar of a first tractor, said apparatus comprising,
   a supporting framework including horizontal plate members attached at their rearward ends to the push bar of a tractor and converging in overlying relationship at their forward ends,
   an upright blade element having leading and trailing vertical edges and adapted for advancement by said tractor along a horizontal path extending below the ground surface, said blade element having a series of vertically spaced transverse apertures,
   an elongated housing attached to said blade along the trailing edge thereof for the downward passage therethrough of a flexible conduit for deposit within said trench,
   a blade holder U-shaped in horizontal section and including pivot means having a horizontal axis, said holder having a series of apertures corresponding to the apertures in said blade element for the selective reception of said pivot means attaching said blade element to said holder for oscillatory movement of said blade element about said horizontal axis, said blade holder further including forwardly extending bracket means pivotally attached at its forward end to the forward end of said plate members for relative swinging movement therebetween about an upright axis,
   means carried by said blade holder imparting oscillatory motion to said blade element including lost motion coupling means interconnecting said blade element and said means imparting oscillatory motion at a point above said pivot means, and
   forwardly disposed draft means exerting a substantially constant forward pull on said blade element by means of a second tractor.

8. A ground separating apparatus in supported engagement with a vehicle, said apparatus comprising;
   an upright elongate blade element adapted for rapid fore and aft oscillatory motion about a horizontal axis while advancing along a linear horizontal path and having its bottom portion advancing along below the ground surface,
   a supporting framework for said blade element mounted on said vehicle,
   blade element mounting means carried by said supporting framework including a pivot pin embodying said horizontal axis extending transversely through said blade and pivotally attaching same to said mounting means for allowing said oscillatory motion, and
   powered reciprocal means for imparting said oscillatory motion loosely coupled with said blade element at the upper end thereof permitting lost motion between said blade and said reciprocal means for imparting of intermittent impact blows to said blade whereby the blade will be forcefully rotated about said pivot pin to cause the leading edge of the blade's bottom portion to be intermittently driven into ground engagement.

9. A ground separating apparatus as claimed in claim 8 wherein said powered reciprocal means includes a pin extending transversely through an aperture formed in said blade element, said aperture being of a greater magnitude than the corresponding dimension of said pin for allowing lost motion between said pin and said blade element, and arm means carrying said last mentioned pin and connected at their opposite ends with means for imparting reciprocal motion to said arms.

References Cited

UNITED STATES PATENTS

| | | | |
|---|---|---|---|
| 3,065,557 | 11/1962 | Pewthers | 37—141 |
| 3,113,390 | 12/1963 | Pewthers | 37—142 |
| 3,286,534 | 11/1966 | Truelock et al. | 172—40 X |
| 3,293,778 | 12/1966 | McAuliff | 172—40 X |
| 3,339,641 | 9/1967 | Carter | 172—40 |
| 2,702,502 | 2/1955 | Rogneby. | |
| 2,704,613 | 3/1955 | Biedess. | |
| 2,905,253 | 9/1959 | Ditter. | |
| 3,140,745 | 7/1964 | Hinkle et al. | |
| 3,170,300 | 2/1965 | Kelly. | |
| 3,201,944 | 8/1965 | Christensen. | |
| 3,222,876 | 12/1965 | Harmstorf. | |
| 3,232,358 | 2/1966 | Heiberg. | |
| 3,307,363 | 3/1967 | Kinnan. | |
| 3,326,009 | 6/1967 | Gagne. | |
| 3,326,010 | 6/1967 | Gagne. | |

EARL J. WITMER, *Primary Examiner.*

U.S. Cl. X.R.

172—40